United States Patent
O'Krafka et al.

(10) Patent No.: US 7,174,430 B1
(45) Date of Patent: Feb. 6, 2007

(54) BANDWIDTH REDUCTION TECHNIQUE USING CACHE-TO-CACHE TRANSFER PREDICTION IN A SNOOPING-BASED CACHE-COHERENT CLUSTER OF MULTIPROCESSING NODES

(75) Inventors: Brian W. O'Krafka, Austin, TX (US); Michael J. Koster, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 387 days.

(21) Appl. No.: 10/889,953

(22) Filed: Jul. 13, 2004

(51) Int. Cl.
*G06F 12/00* (2006.01)

(52) U.S. Cl. ............... 711/141; 711/146; 711/147
(58) Field of Classification Search ............ None
See application file for complete search history.

(56) References Cited

U.S. PATENT DOCUMENTS

| | | | |
|---|---|---|---|
| 6,883,070 B2* | 4/2005 | Martin et al. | 711/141 |
| 6,981,097 B2* | 12/2005 | Martin et al. | 711/130 |
| 2002/0133674 A1* | 9/2002 | Martin et al. | 711/141 |
| 2005/0144395 A1* | 6/2005 | Martin et al. | 711/141 |
| 2005/0160430 A1* | 7/2005 | Steely et al. | 719/310 |
| 2005/0198187 A1* | 9/2005 | Tierney et al. | 709/214 |
| 2005/0240735 A1* | 10/2005 | Shen et al. | 711/144 |

* cited by examiner

*Primary Examiner*—Kevin Verbrugge
(74) *Attorney, Agent, or Firm*—Osha Liang LLP

(57) ABSTRACT

A multiprocessing node in a snooping-based cache-coherent cluster of processing nodes maintains a cache-to-cache transfer prediction directory of addresses of data last transferred by cache-to-cache transfers. In response to a local cache miss, the multiprocessing node may use the cache-to-cache transfer prediction directory to predict a cache-to-cache transfer and issue a restricted broadcast for requested data that allows only cache memories in the cluster to return copies of the requested data to the requesting multiprocessing node, thereby reducing the consumption of bandwidth that would otherwise be consumed by having a home memory return a copy of the requested data in response to an unrestricted broadcast for requested data that allows cache memories and home memories in a cluster to return copies of the requested data to the requesting multiprocessing node.

39 Claims, 9 Drawing Sheets

| Address | Cache-to-Cache Transfer Predictor |
|---------|-----------------------------------|
| G | 1 |
| Z | 1 |
| P | 0 |
| B | 1 |
| R | 0 |
| M | 1 |
| A | 1 |
| F | 0 |

BANDWIDTH REDUCTION TECHNIQUE USING CACHE-TO-CACHE TRANSFER PREDICTION IN A SNOOPING-BASED CACHE-COHERENT CLUSTER OF MULTIPROCESSING NODES

BACKGROUND OF INVENTION

As shown in FIG. 1, a typical computer system 10 includes at least a microprocessor 12 and a main memory 14. The main memory 14 contains data for use by the microprocessor 12 to perform the operations of the computer system 10. However, because the speed of the microprocessor 12 is typically significantly faster than that of the main memory 14, memory of smaller size and faster speed (referred to and known as "cache" memory) is often implemented to allow the microprocessor 12 to access frequently and/or recently requested data faster than it would otherwise take to obtain such data from the main memory 14.

Still referring to FIG. 1, the microprocessor 12 has an "on-chip" (i.e., on the same semiconductor die as the microprocessor 12), or "L1," cache memory 16 and an "off-chip," or "L2," cache memory 18. When the microprocessor 12 requests data, a cache controller 20 causes the L1 cache memory 16 to be searched for the requested data, and if that search does not "hit" (i.e., a cache "miss" occurs), the L2 cache memory 18 is searched for the requested data. If the requested data is not found in the cache memories 16, 18, the requested data is retrieved from the relatively slow main memory 14.

Those skilled in the art will recognize that a microprocessor may have any number of cache memory levels, which are typically referred to by number in order of decreasing proximity to the microprocessor. Further, those skilled in the art will recognize that any number of cache memories may be on-chip and any number of cache memories may be off-chip.

A computer system, like the one shown in FIG. 1, may be used as a system that services requests from and provides data to other computers connected over a network. Such a client-server network model 30 is shown in FIG. 2. In FIG. 2, a stand-alone server 32 is connected over a network 34 to several client computers 36, 38, 40, 42. The server 32 may be used to store data, programs, etc. for use by the client computers 36, 38, 40, 42. Those skilled in the art will recognize that the server 32 may also be used to manage and control the client computers 36, 38, 40, 42.

Although some computer systems, like the one shown in FIG. 1, have a single microprocessor 12 (such a computer system referred to and known as a "uniprocessor" computer system), other computer systems, like the server 32 shown in FIG. 2, may be formed of multiple microprocessors. FIG. 3 shows such a multiprocessing computer system 50.

The computer system 50 of FIG. 3 is shown as having multiple microprocessors 52, 54, 56, 58. The microprocessors 52, 54, 56, 58 communicate with one another and with a main memory 60 over a network (e.g., a bus) 62. The network 62 is implemented as a set of bits that propagate data in parallel from one location to another. The "bandwidth" of the network 62 (i.e., the number of bits propagated in parallel by the network 62) is an important factor in the overall performance of the computer system 50. FIG. 3 also shows an input/output interface 64 that is connected to the network 62 and serves to input and output data to other portions of the computer system 50 and/or components external to the computer system 50.

Those skilled in the art will recognize that the multiprocessing computer system 50 of FIG. 3 may represent a particular type of multiprocessing computer system used in networking and known and referred to as a symmetric multiprocessing (SMP) computer system. A SMP computer system is one in which multiple microprocessors share, for example, the same memory and input/output interface. Those skilled in the art will also recognize that a SMP computer system may share the same operating system. Although the multiple microprocessors in a SMP computer system share the same resources, each microprocessor may act independently. For example, while one microprocessor searches for data in memory, other microprocessors may update the memory and perform other tasks, thereby increasing the ability of the SMP computer system to handle intensive networking demands.

Those skilled in the art will recognize that SMP computer systems provide good scalability in that additional microprocessors may be added or removed with minimal changes to the system. Despite the benefits of SMP computer systems, bottlenecks may occur when several microprocessors on a board share a single memory bus. Rather than put too many microprocessors on the same SMP board, designers of network elements often distribute applications across a networked cluster of SMP boards, where each board has its own memory, I/O interface, and operating system.

SUMMARY OF INVENTION

According to one aspect of one or more embodiments of the present invention, a computer system comprises: a first processing node having a snooping-based cache-coherence controller, the first processing node further having a directory of addresses of data transferred by cache-to-cache transfers and prediction information associated with the addresses; and a second processing node operatively connected to the first processing node, where, in response to a cache miss for data requested by the first processing node, the snooping-based cache-coherence controller is arranged to, dependent on the directory, issue a restricted broadcast for the requested data to the second processing node.

According to another aspect of one or more embodiments of the present invention, a method of performing operations in a network of point-to-point connected processing nodes comprises: requesting data from a cache memory of a first processing node; if the requested data is not found in the cache memory, searching for an address of the requested data in a list of addresses of data transferred by cache-to-cache transfers in the network, where prediction information is associated with the addresses; and if an address of the requested data is found in the list and dependent on prediction information associated with the address, issuing a restricted broadcast for the requested data across the network of point-to-point connected processing nodes.

According to another aspect of one or more embodiments of the present invention, a modular computer system comprises: a plurality of integrated circuits; and a snooping-based cache-coherence controller operatively connected to the plurality of integrated circuits, the snooping-based cache-coherence controller having a cache memory and capable of maintaining a directory of addresses of data transferred by cache-to-cache transfers, where the modular computer system is point-to-point connectable to other modular computer systems, and where, if data requested by one of the plurality of integrated circuits is not found in the cache memory and an address of the requested data is found in the directory, the snooping-based cache-coherence controller is configured to issue a restricted broadcast for the requested data dependent on prediction information maintained in the directory for the address.

According to another aspect of one or more embodiments of the present invention, a computer network comprises: a cluster of individual SMP computer systems that are connected using point-to-point interconnect, at least one of the individual SMP computer systems having a snooping-based cache-coherence controller and a directory of addresses of data transferred by cache-to-cache transfers in the network, where, in response to a cache miss for requested data in the cache memory of the at least one of the individual SMP computers and dependent on the directory, the snooping-based cache-coherence controller is arranged to issue a restricted broadcast for the requested data across the cluster.

According to another aspect of one or more embodiments of the present invention, a computer system comprises a plurality of integrated circuits, a snooping-based cache-coherence controller connected to the plurality of integrated circuits and having a cache memory and a list of addresses of data transferred by cache-to-cache transfers, and memory comprising instructions to: selectively request data from the cache memory; if the requested data is not found in the cache memory, search the list for an address of the requested data; and if the address of the requested data is found in the list, issue a restricted broadcast for the requested data dependent on prediction information associated with the address.

Other aspects and advantages of the invention will be apparent from the following description and the appended claims.

BRIEF DESCRIPTION OF DRAWINGS

FIG. 8 shows an exemplary representation of a portion of a computer system in accordance with an embodiment of the present invention.

DETAILED DESCRIPTION

Figure 1:
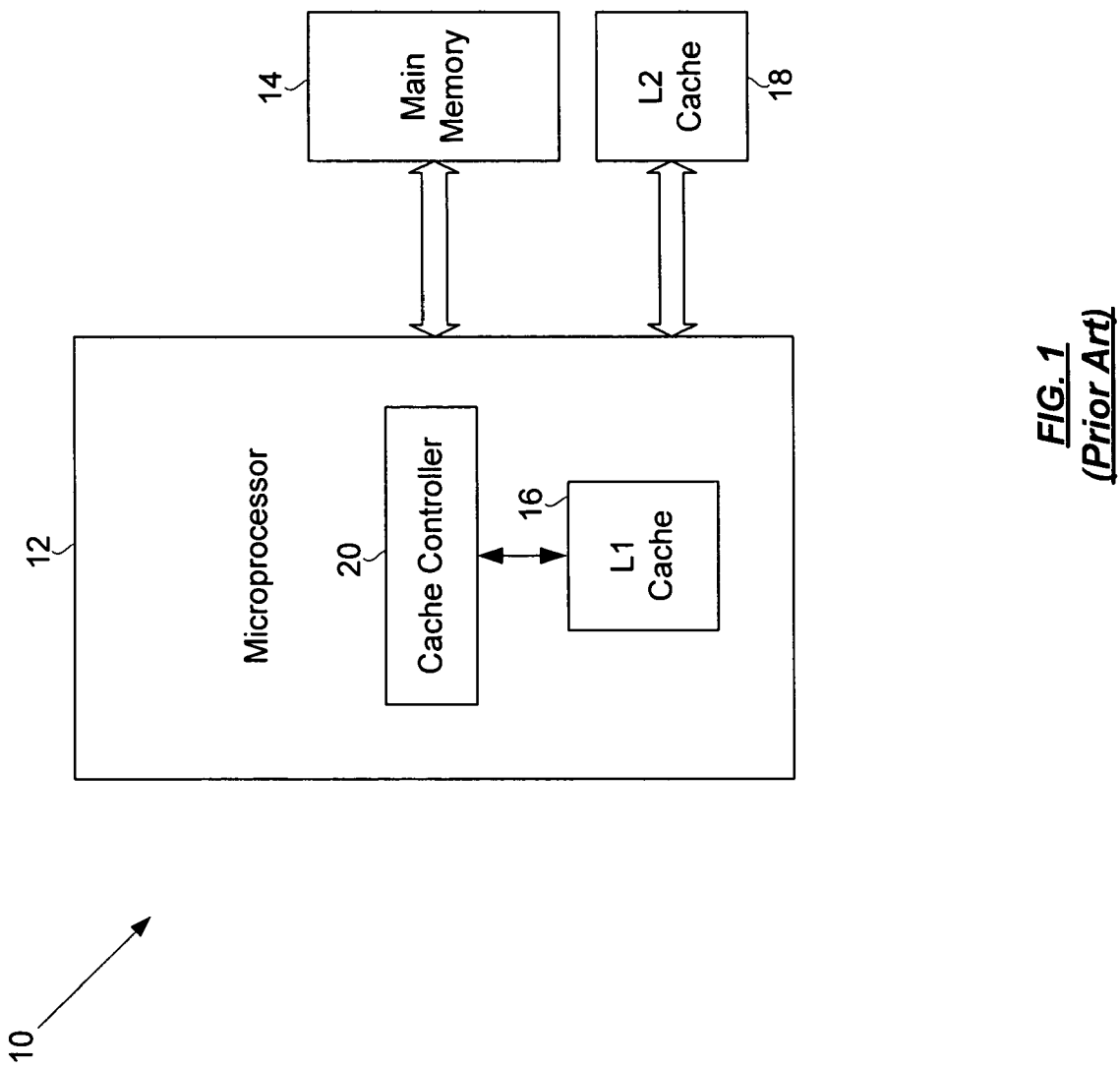
FIG. 1 shows a typical computer system.
Figure 2:
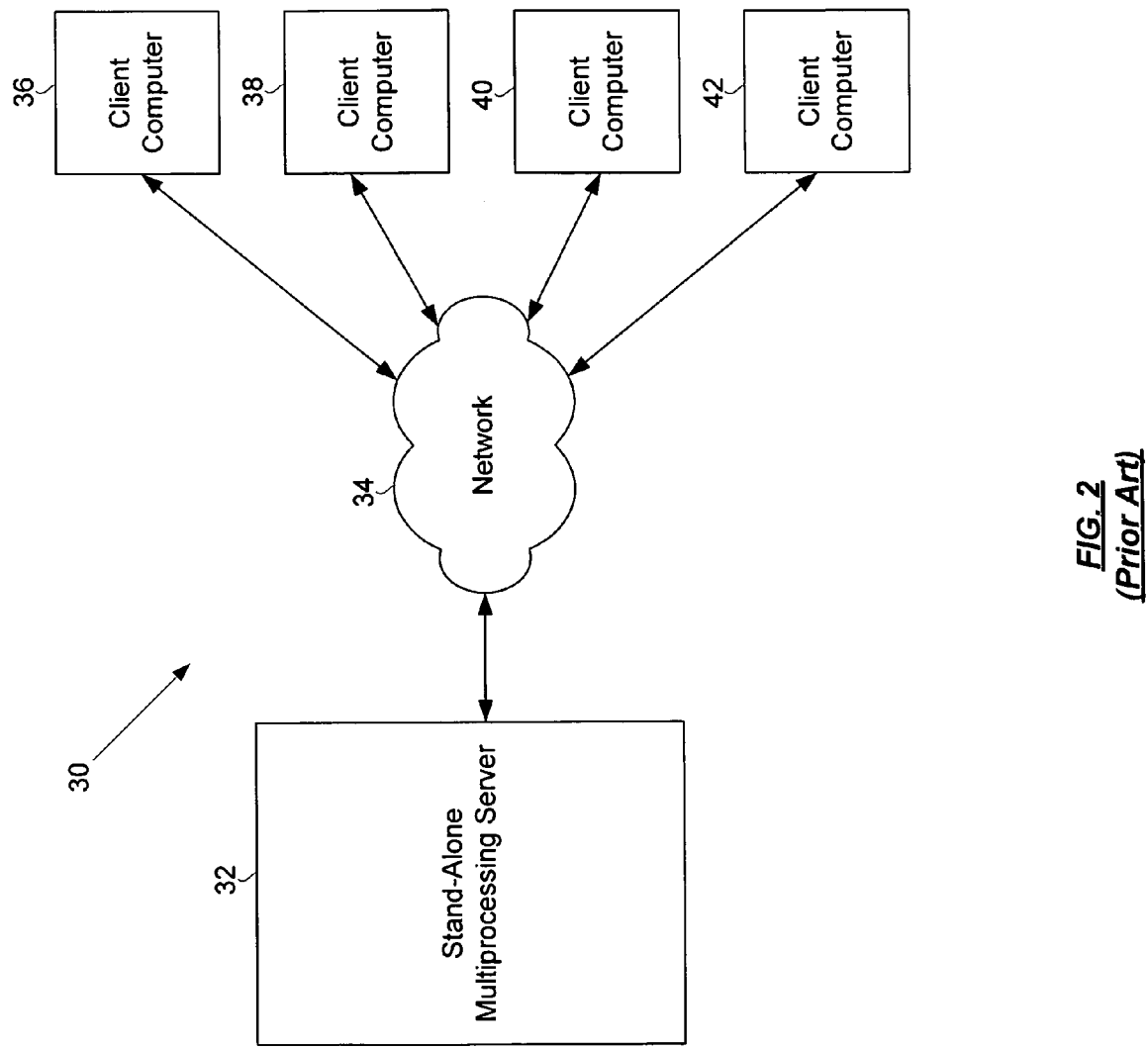
FIG. 2 shows a typical computer network.
Figure 3:
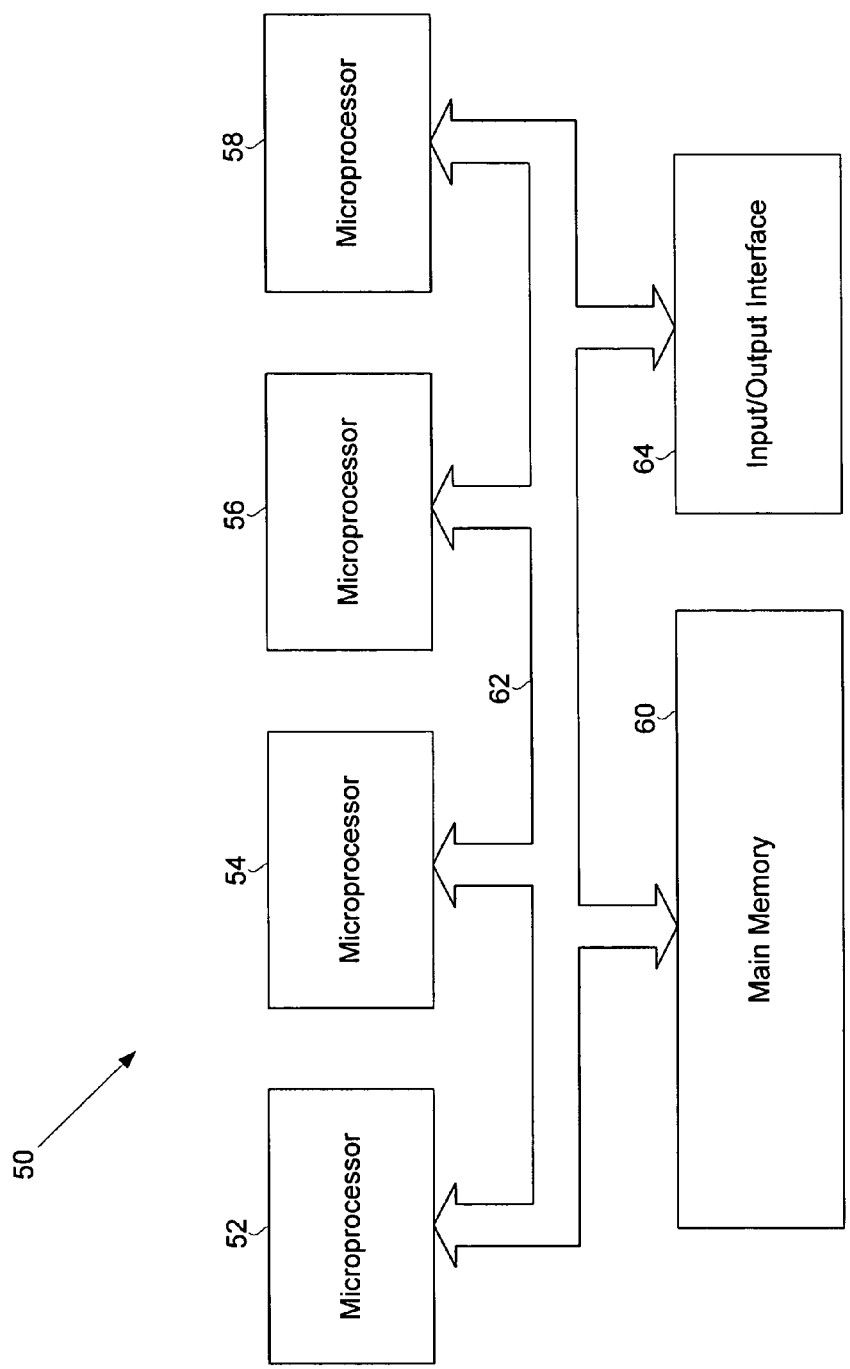
FIG. 3 shows a typical multiprocessor computer system.

In a SMP computer system, such as that shown in FIG. 3, each microprocessor has its own cache memory (see description of cache memories above with reference to FIG. 1). Thus, because a particular cache memory data item acted upon by one microprocessor may cause the copy of that data item to differ from other copies of that data item stored in the cache memories of the various microprocessors in a SMP computer system, "cache-coherency" techniques are implemented to ensure that the local cache memory of each microprocessor is consistent with respect to values that are stored in the cache memories of other microprocessors in the SMP computer system.

Cache-coherence problems arise in SMP computer systems when more than one microprocessor cache memory holds a copy of a data item. One type of cache-coherency technique known and referred to as a "snooping" relies on all cache memories to monitor a common network (e.g., a bus) that connects microprocessors to memory. In other words, a snooping-based cache-coherency technique depends on the ability of cache memories to observe every transaction on a network (e.g., a bus) common to the cache memories.

Figure 4:
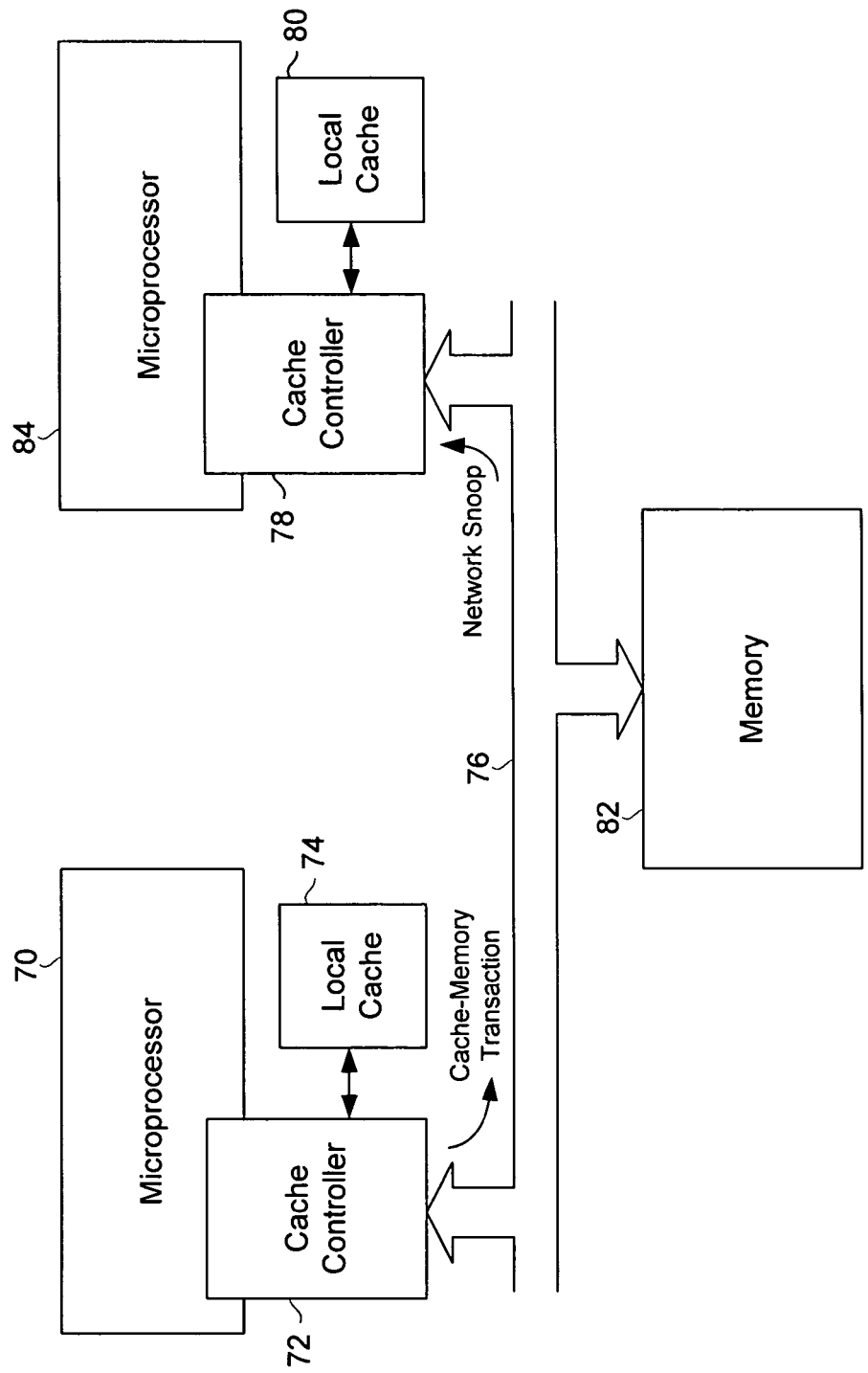
FIG. 4 shows a snooping cache-coherent multiprocessor computer system.

Now referring to FIG. 4, when microprocessor 70 requests data, a cache controller 72 local to microprocessor 70 searches for the requested data in a cache memory 74 local to microprocessor 70. If the requested data is not found in the local cache memory 74, the cache controller 72 broadcasts a data request on a network (e.g., a bus) 76 connected to other cache controllers (e.g., cache controller 78) (others not shown). The cache controllers (e.g., cache controller 78) "snoop" on the network 76 to monitor all transactions on the network 76. If a particular cache memory (e.g., cache memory 80 associated with microprocessor 84) has the data requested by the requesting cache controller 72, the cache controller (e.g., cache controller 78) associated with the cache memory (e.g., cache memory 80) having the requested data forwards (i.e., returns) the requested data to the requesting cache controller 72, which, in turn, updates its associated cache memory 74 with the returned requested data and provides the returned requested data to requesting microprocessor 70. Alternatively, if the requested data is not held in any of the cache memories 74, 80, a copy of the requested data in the main memory 82 is returned to and used by the requesting microprocessor 70.

Further, a cache controller, connected to the network 76, that observes data being written from one cache memory to another may invalidate or update its own copy of that data. The next time the cache controller's microprocessor requests that data, the most recent value of the data is provided to the microprocessor, either because its local cache memory has the most recent value of the data or through obtaining that data by generating a data request on the network 76.

Those skilled in the art will recognize that although a snooping-based cache-coherency technique obtains data relatively quickly (i.e., has relatively low latency), such a technique consumes relatively high bandwidth due to the parallel broadcast nature of its requests. As a result, snooping-based cache-coherency techniques are typically limited to small-scale systems.

Figure 5:
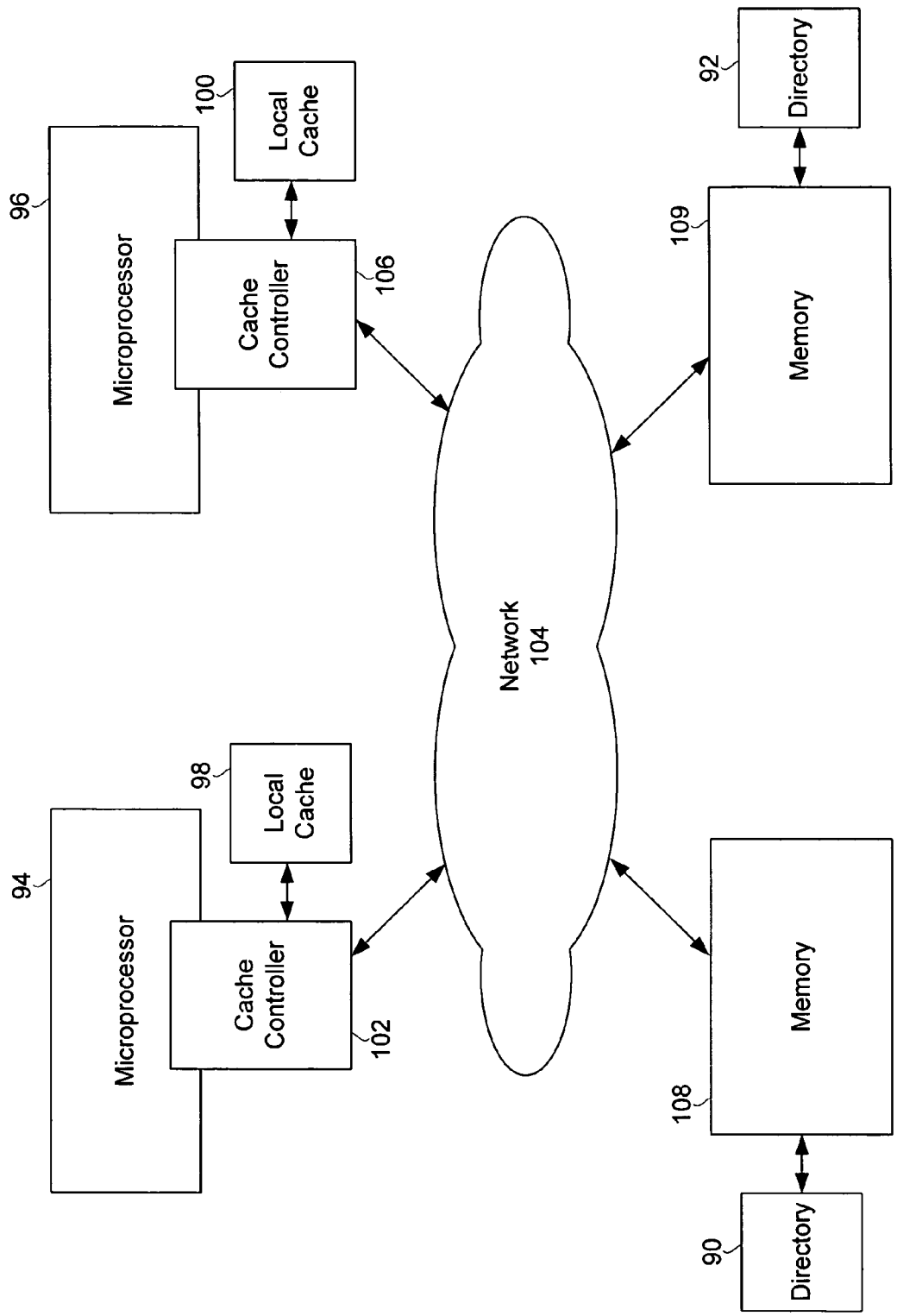
FIG. 5 shows a directory-based cache-coherent multiprocessor computer system.

Now referring to FIG. 5, in another type of cache-coherency technique known and referred to as "directory-based cache-coherence," when a cache miss occurs in a local cache memory (e.g., local cache memory 98 or 100) of a microprocessor (e.g., microprocessor 94 or 96), a cache controller (e.g., cache controller 102 or 106) issues a data request over a network 104 to a "home" directory (e.g., directory 90 or 92) of the requested data, the "home" directory typically being associated with the "home" memory (e.g., memory 108 or 109) of the requested data. The "home" directory may indicate to the cache controller a location of the requested data. Alternatively, if the "home" directory indicates that no other cache memories connected to the network 104 have the requested data, the requested data may be returned by the "home" memory of the requested data.

One advantage of directory-based cache-coherency techniques with respect to snooping-based cache-coherency techniques is that they keep track of which microprocessor nodes have copies of particular data, thereby eliminating the need for a high-bandwidth data request broadcast. This is valuable on read misses because a data request is subsequently satisfied either by the directory indicating the location of a copy of the requested data or by accessing the main memory.

Further, because directory-based cache-coherent techniques may rely on low-bandwidth interconnect rather than on high-bandwidth networks (e.g., buses) that are necessary for broadcasting in snooping-based cache-coherency techniques, directory-based cache-coherent SMP computer systems may be scalable to a large number of microprocessors. However, the indirection overheads associated with directory queries make directory-based cache-coherency techniques slower (i.e., have higher latency) than snooping-based cache-coherency techniques (e.g., a directory-based cache-coherence technique may often require three times the number of "hops" otherwise taken in a snooping-based cache-coherence technique).

For example, in a snooping-based cache-coherency technique, upon a cache miss, one set of parallel messages is broadcast over a network and one response message with the requested data is sent back to the requesting processing node. On the other hand, in a directory-based cache-coherent technique, upon a cache miss, a data request message is sent to the home processing node, the home processing node forwards the data request message to the owning cache memory, and the owning cache memory returns the requested data to the requesting processing node. Thus, generally, in snooping-based cache-coherency techniques, there are more messages in parallel (relatively low average latency), while in directory-based cache-coherency techniques, there are more messages in series (relatively high average latency).

Often, several small SMP servers (e.g., near-commodity modular shelf servers) are connected together to provide increased processing capabilities. Due to the limited bandwidth of the cables connecting the servers, directory-based cache-coherency techniques are required to ensure cache-coherence among the servers. However, as described above, directory-based cache-coherency techniques have relatively high average latency compared to snooping-based cache-coherency techniques.

In one or more embodiments of the present invention, a cluster of microprocessing nodes (e.g., a multiprocessing server) are connected together and use snooping-based cache-coherence to maintain consistency among cache memories of the microprocessing nodes. As described further below, such snooping-based cache-coherence is made possible by, perhaps among other things, using high-speed point-to-point interconnect to connect the multiprocessing nodes. Further, embodiments of the present invention relate to a technique for reducing the bandwidth consumed in a snooping-based cache-coherent cluster of microprocessing nodes.

Figure 6:
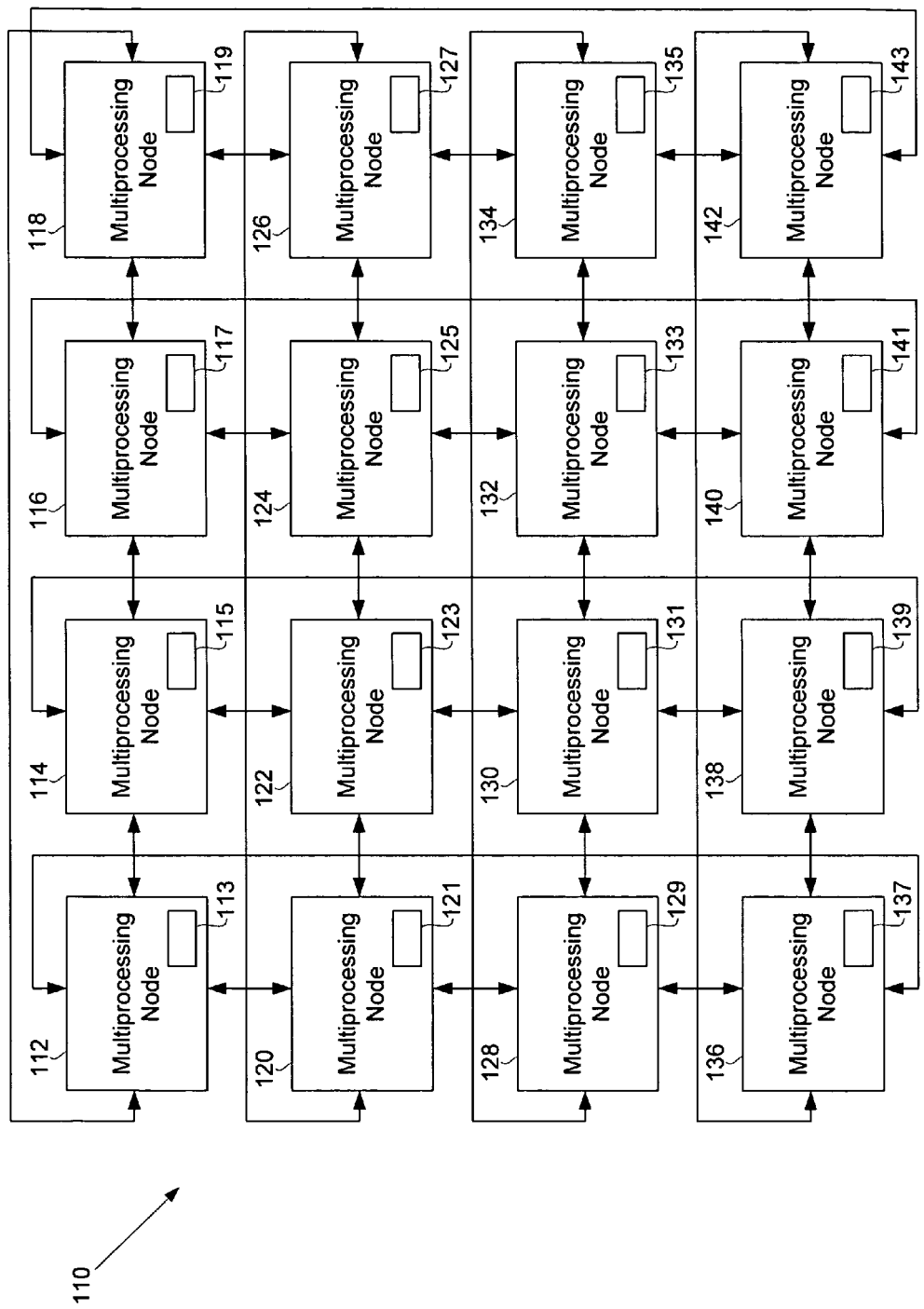
FIG. 6 shows a computer system in accordance with an embodiment of the present invention.

FIG. 6 shows an exemplary computer system 110 in accordance with an embodiment of the present invention. In FIG. 6, a plurality of multiprocessing nodes 112, 114, 116, 118, 120, 122, 124, 126, 128, 130, 132, 134, 136, 138, 140, 142 are point-to-point connected using high-bandwidth interconnect (shown but not labeled). Particularly, each multiprocessing node (also referred to as "processing node") 112, 114, 116, 118, 120, 122, 124, 126, 128, 130, 132, 134, 136, 138, 140, 142 is connected to an adjacent multiprocessing node (in FIG. 6, each peripheral multiprocessing node is shown as being connected to the opposite peripheral multiprocessing node, e.g., multiprocessing node 112 is connected to multiprocessing node 118). In one or more other embodiments of the present invention, a microprocessing node may be connected to a non-adjacent microprocessing node. Further, a processing or multiprocessing node is not limited to a server and may be any type of computer system.

Further, in one or more embodiments of the present invention, high-bandwidth interconnect for point-to-point connecting multiprocessing nodes may be implemented using interconnect technologies such as, for example, Infiniband or PCI Express. Moreover, in one or more other embodiments of the present invention, high-bandwidth interconnect used to point-to-point connect multiprocessing nodes may have a bandwidth greater than that of 16-bit 1 GHz interconnect.

Further, in one or more embodiments of the present invention, point-to-point interconnect may be used in cabling a plurality of multiprocessing nodes together. Moreover, in one or more embodiments of the present invention, point-to-point interconnect may be used to connect a plurality of multiprocessing nodes to a passive backplane.

Still referring to FIG. 6, each microprocessing node 112, 114, 116, 118, 120, 122, 124, 126, 128, 130, 132, 134, 136, 138, 140, 142 is shown as having a cache-to-cache transfer prediction directory 113, 115, 117, 119, 121, 123, 125, 127, 129, 131, 133, 135, 137, 139, 141, 143, respectively. A cache-to-cache transfer prediction directory in accordance with one or more embodiments of the present invention is further described below with reference to FIGS. 7 and 8. Further, in one or more other embodiments of the present invention, instead of all the microprocessing nodes in a network having a cache-to-cache transfer prediction directory, only some (i.e., less than all) of the microprocessing nodes may have a cache-to-cache transfer prediction directory.

As described above, embodiments of the present invention use snooping-based cache-coherence. Thus, in FIG. 6, cache-coherence among the high-bandwidth point-to-point connected multiprocessing nodes 112, 114, 116, 118, 120, 122, 124, 126, 128, 130, 132, 134, 136, 138, 140, 142 is achieved using a snooping-based cache-coherency technique. To implement snooping-based cache-coherency, each multiprocessing node 112, 114, 116, 118, 120, 122, 124, 126, 128, 130, 132, 134, 136, 138, 140, 142 has a cache controller (not shown) that is operatively connected by the high-bandwidth interconnect (e.g., shown in FIG. 6) to the cache controllers (not shown) of connected multiprocessing nodes (not shown).

Figure 7:
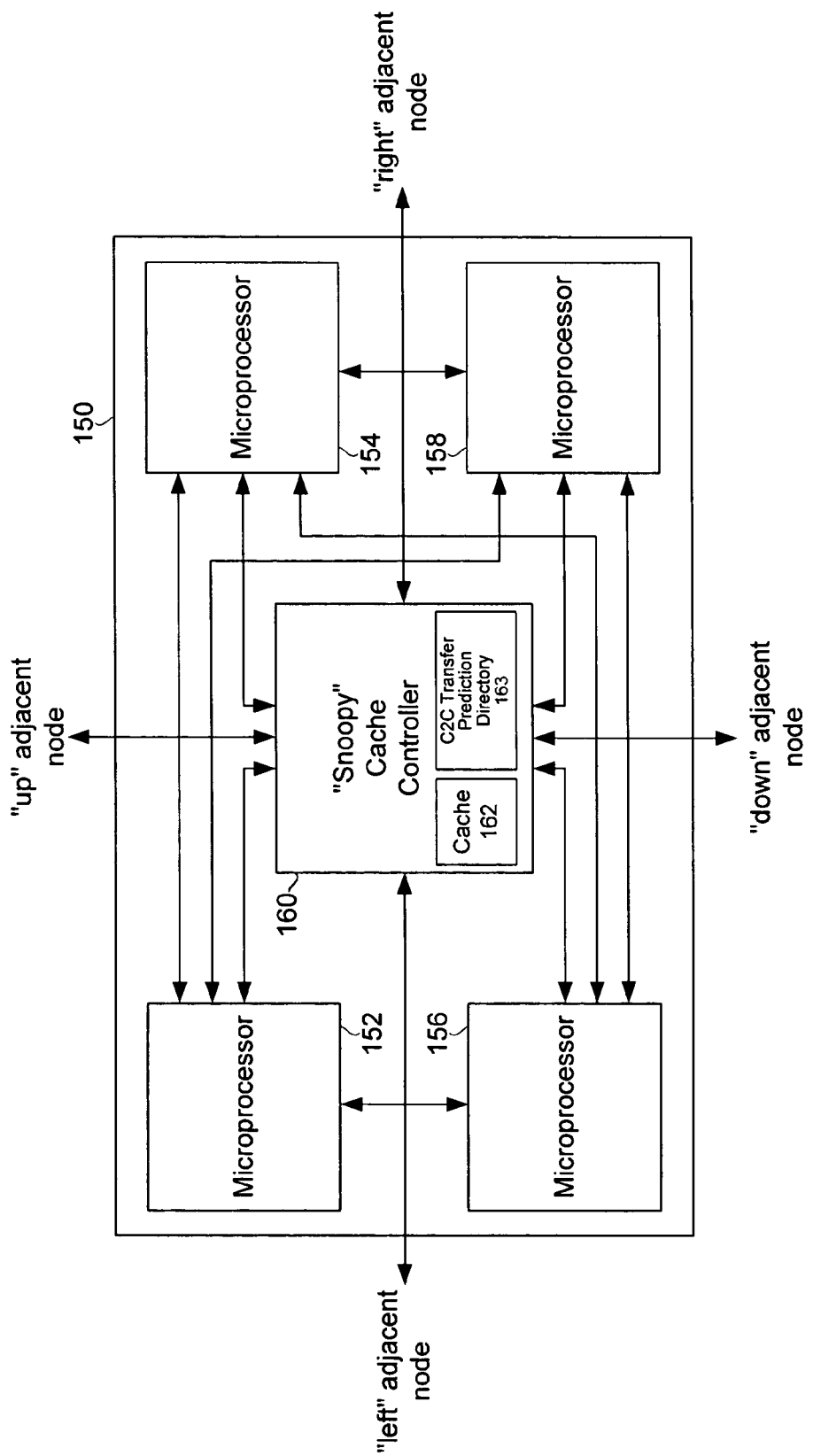
FIG. 7 shows a portion of a computer system in accordance with an embodiment of the present invention.

FIG. 7 shows an exemplary multiprocessing node 150 in accordance with an embodiment of the present invention. In FIG. 7, the multiprocessing node 150 has four microprocessors 152, 154, 156, 158. However, in one or more other embodiments of the present invention, a multiprocessing node may have any number of microprocessors. In FIG. 7, each of the microprocessors 152, 154, 156, 158 is connected to a snooping-based cache-coherence controller 160. The cache-coherence controller (also referred to as "cache controller") 160 is connected over high-bandwidth interconnect to the cache controllers (not shown) of connected multiprocessing nodes (not shown). Further, each microprocessor 152, 154, 156, 158 may be connected to every other microprocessor 152, 154, 156, 158 in the multiprocessing node 150 for, for example, chip-to-chip communication.

Further, although the cache controller 160 in FIG. 7 is shown as being connected to adjacent processing nodes, in one or more other embodiments of the present invention, a cache-coherence controller may be connected to one or more non-adjacent processing nodes.

Still referring to FIG. 7, the cache controller 160 has a cache memory 162 (in addition to the cache memories (not shown) local to the microprocessors 152, 154, 156, 158). In one or more embodiments of the present invention, the cache memory 162 of the cache controller 160 may be sized relatively large (e.g., greater than 32 MB) so as to reduce the frequency of broadcasting data requests to other multiprocessing nodes upon a cache miss in one of its microprocessor's local cache memories. In other words, by sizing cache memory 162 to be relatively large, upon a cache miss in a local microprocessor's local cache memory, the likelihood of the cache controller 160 finding the requested data in the cache memory 162 is increased, thereby reducing the frequency of bandwidth-consuming data request broadcasts to other multiprocessing nodes (not shown). The cache memory 162 may hold copies of data that are frequently and/or recently requested by the local microprocessors 152, 154, 156, 158 of the multiprocessing node 150.

Still referring to FIG. 7, the cache controller 160 also has cache-to-cache ("C2C") transfer prediction table 163. As is further described below with reference to FIG. 8, the cache-to-cache transfer prediction directory 163 maintains a list of addresses of data last transferred by cache-to-cache transfer transactions. Those skilled in the art will note that a cache-to-cache transfer is a transaction in which, upon a local cache miss, data (or an address thereof) is transferred from a remote cache to the local cache. In other words, a transfer of data (or an address thereof) between cache memories of different processing nodes is a cache-to-cache transfer. Those skilled in the art will note that in some workloads, a considerable percentage of bandwidth consumption may be attributable to cache-to-cache transfers.

Still referring to FIG. 7, when a microprocessor (e.g., microprocessor 152) requests data that is not found in its local cache memories (not shown), the cache controller 160 searches cache memory 162 for the requested data, and if the requested data is not found in cache memory 162 (i.e., a local cache miss has occurred), the cache controller 160 may either, depending on the contents of the cache-to-cache transfer prediction directory 163, (i) perform a "restricted" snooping-based cache-coherence operation (e.g., broadcast a data request such that only cache controllers (not shown) "snooping" the data request are allowed to return data (via cache-to-cache transfer) to a requesting processing node) or (ii) perform an "unrestricted" snooping-based cache-coherence operation (e.g., broadcast a data request such that cache controllers (not shown) and home memories (not shown) "snooping" the data request are allowed to return data to the requesting processing node).

FIG. 8 shows an exemplary cache-to-cache transfer prediction directory 170 in accordance with an embodiment of the present invention. Generally, the cache-to-cache transfer prediction directory 170 maintains a list of locations (i.e., addresses) of data last transferred by cache-to-cache transfers. The cache-to-cache transfer prediction directory 170 includes an Address field (or column) that references a number of addresses of data recently and/or frequently returned using cache-to-cache transfers. For example, if in FIG. 8, the top-most entry in the cache-to-cache transfer prediction directory 170 represents the data most recently returned from a cache memory of a remote processing node (i.e., a processing node different than that of a cache controller (e.g., 160 in FIG. 7) to which the cache-to-cache transfer prediction directory 170 is considered "local"), address G is the address of the last data returned to the cache controller by a remote cache memory.

Further, the cache-to-cache transfer prediction directory 170 includes a Cache-to-Cache Transfer Predictor field (or column) having entries that indicate whether a cache-to-cache transfer should be predicted when corresponding entries in the Address field are referenced. For example, in the cache-to-cache transfer prediction directory 170, if address B is an address of data requested by an associated cache controller, the value of the corresponding cache-to-cache transfer predictor entry is used to predict a cache-to-cache transfer of a valid copy of the requested data at address B.

In the cache-to-cache transfer prediction directory 170 shown in FIG. 8, a "1" value in a cache-to-cache transfer predictor entry is used to indicate that a cache-to-cache transfer should be predicted. However, in one or more other embodiments of the present invention, a "0" value in a cache-to-cache transfer predictor entry may be used to indicate that a cache-to-cache transfer should be predicted. Further, although the values in the cache-to-cache transfer predictor entries in the cache-to-cache transfer prediction directory 170 of FIG. 8 are shown as being 1-bit values, in one or more other embodiments of the present invention, values in cache-to-cache transfer predictor entries of a cache-to-cache transfer prediction directory may be indicated using any number of bits.

Those skilled in the art will note that a cache-to-cache transfer prediction directory in accordance with one or more embodiments of the present invention may maintain a list of addresses of data last transferred by cache-to-cache transfers throughout a network. In one or more other embodiments of the present invention, a cache-to-cache transfer prediction directory may maintain a list of addresses of data last transferred by cache-to-cache transfers involving particular cache memories.

Those skilled in the art will note that the a cache-to-cache transfer prediction directory in accordance with one or more embodiments of the present invention may be implemented using hardware and/or software and is not limited to a table structure. In other words, the information shown in the address cache-to-cache transfer prediction directory 170 may be maintained by any type of data structure. Further, an address directory table in accordance with one or more embodiments of the present invention may contain less, more, and/or different information than that shown in FIG. 8.

Referring back to FIG. 6, if a cache-to-cache transfer prediction directory of a multiprocessing node (e.g., microprocessing node 116) is deactivated or otherwise not used, when the multiprocessing node broadcasts a data request in response to a local cache miss, a home memory (i.e., a main memory) having the requested data returns its copy of the requested data to the multiprocessing node even if a modified copy of the requested data residing in a remote cache memory is returned to the multiprocessing node. In other words, by issuing such an "unrestricted" data request broadcast, all "snoopers" of the broadcast, including remote cache memories (via cache controllers) and home memories, return a "snoop" response to the broadcast-issuing multiprocessing node (i.e., the requesting multiprocessing node). In turn, the requesting multiprocessing node selects the correct copy of the requested data from among the received copies of the requested data. Accordingly, by issuing an "unrestricted" data request broadcast, bandwidth may be consumed for both a cache-to-cache transfer and a transfer of data from a home memory to a requesting multiprocessing node.

By activating or otherwise using a cache-to-cache transfer prediction directory, the frequency of bandwidth consumption by a cache-to-cache transfer concurrent with a transfer of data from a home memory may be reduced as is further described below with reference to FIG. 9.

Figure 9:
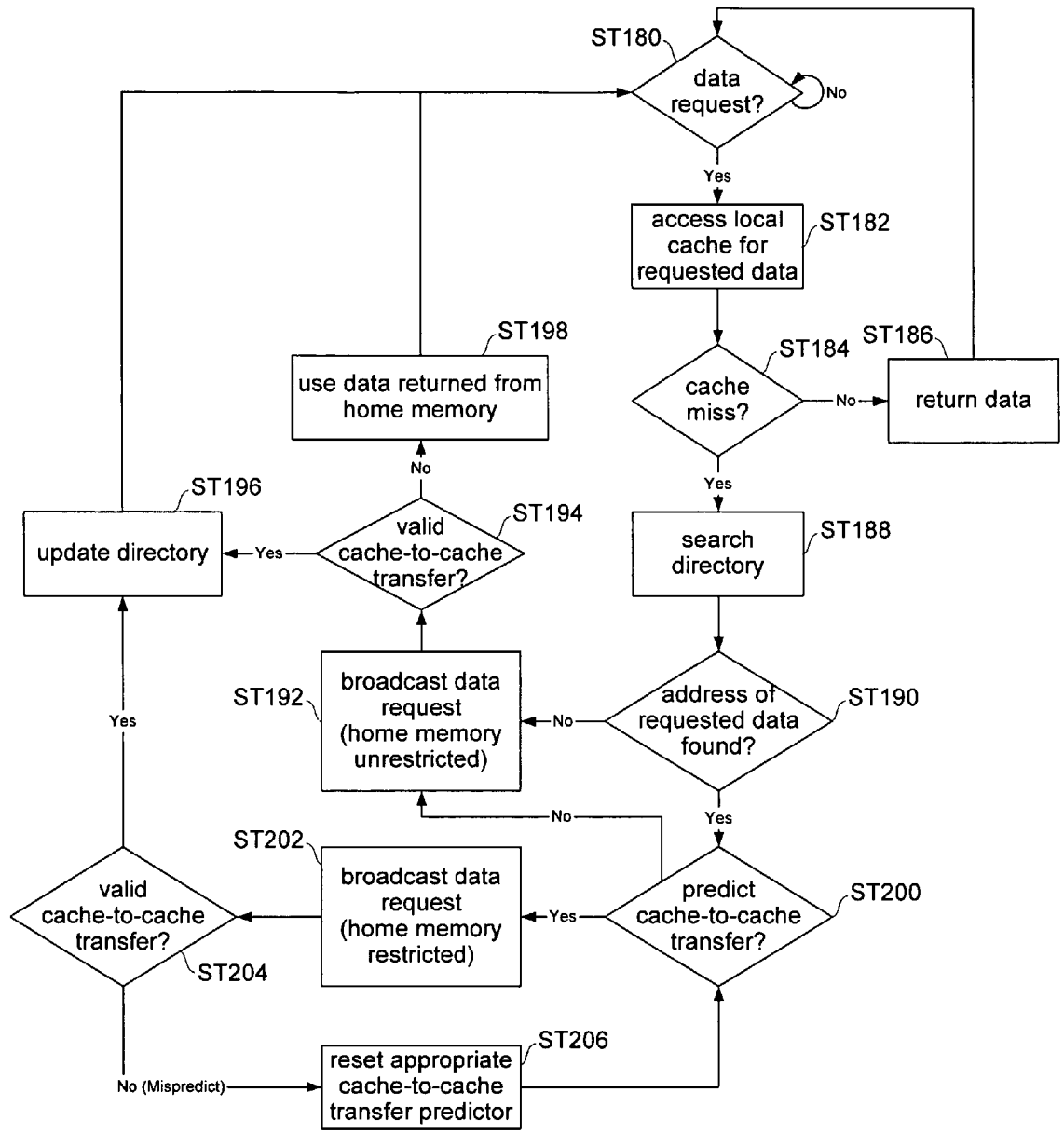
FIG. 9 shows a flow process in accordance with an embodiment of the present invention.

FIG. 9 shows an exemplary flow process in accordance with an embodiment of the present invention. Once a processing node (e.g., a multiprocessing server) requests data ST180, the requesting processing node's local cache memory is accessed and searched for the requested data ST182. If the requested data is in the local cache memory (i.e., a local cache miss has not occurred; instead a local cache hit has occurred) ST184, the found data is returned and used by the requesting processing node ST186.

However, if the requested data is not in the local cache memory (i.e., a local cache miss has occurred) ST184, the requesting processing node's cache-to-cache transfer prediction directory is searched for an address of the requested data ST188. If an address of the requested data is not found in the requesting processing node's cache-to-cache transfer prediction directory ST190, then the requesting processing node issues an "unrestricted" broadcast for the requested data ST192, thereby allowing both remote cache memories and home memories to return copies of the requested data to the requesting processing node.

If in response to the "unrestricted" broadcast ST192, the requesting processing node receives a valid copy of the requested data from a remote cache memory (i.e., by cache-to-cache transfer) ST194, the requesting processing node accordingly updates its cache-to-cache transfer prediction directory ST196 by, for example, (i) incorporating the address of the received requested data into the cache-to-cache transfer prediction directory and (ii) setting a value of an associated cache-to-cache transfer predictor entry in the cache-to-cache transfer prediction directory to indicate that a cache-to-cache transfer should be predicted when the incorporated address is next referenced by the requesting processing node (in response to a local cache miss). Those skilled in the art will note that the cache-to-cache transfer prediction directory may be updated in a variety of ways.

Alternatively, if in response to the "unrestricted" broadcast ST192, the requesting processing node does not receive a valid copy of the requested data from a remote cache memory (i.e., by cache-to-cache transfer) ST194, the requesting processing node uses the copy of the requested data returned by the home memory of the requested data ST198.

Referring back to step ST190, if an address of the requested data is found (i.e., referenced) in the requesting processing node's cache-to-cache transfer prediction directory, then a cache-to-cache transfer predictor entry associated with the referenced address is used to predict whether a cache-to-cache transfer should be predicted ST200. If the cache-to-cache transfer predictor entry indicates that a cache-to-cache transfer should not be predicted, the requesting processing node issues an "unrestricted" broadcast for the requested data ST192, thereby allowing both remote cache memories and home memories to return their copies of the requested data to the requesting processing node. The steps after step ST192 are described above.

If the cache-to-cache transfer predictor entry indicates that a cache-to-cache transfer should be predicted, the requesting processing node issues an "restricted" broadcast for the requested data ST202, thereby allowing only remote cache memories to return one or more copies of the requested data to the requesting processing node. If in response to the "restricted" broadcast ST202, the requesting processing node does not receive a valid copy of the requested data from a remote cache memory (i.e., by cache-to-cache transfer) ST204, (i) the value of the cache-to-cache transfer predictor entry associated with the address referenced in step ST190 is reset to indicate that a cache-to-cache transfer should not be predicted ST206, (ii) in step ST200, a cache-to-cache transfer is not predicted (due to the reset of the value of the cache-to-cache transfer predictor entry in step ST206), and (iii) the requesting processing node, in turn, issues an "unrestricted" broadcast for the requested data ST192, thereby allowing both remote cache memories and home memories to return their copies of the requested data to the requesting processing node. The steps after step ST192 are described above.

If in response to the "restricted" broadcast ST202, the requesting processing node receives a valid copy of the requested data from a remote cache memory (i.e., by cache-to-cache transfer) ST204, the requesting processing node accordingly updates its cache-to-cache transfer prediction directory ST196 by, for example, (i) incorporating the address of the received requested data into the cache-to-cache transfer prediction directory and (ii) setting a value of an associated cache-to-cache transfer predictor entry in the cache-to-cache transfer prediction directory to indicate that a cache-to-cache transfer should be predicted when the incorporated address is next referenced by the requesting processing node (in response to a local cache miss). Those skilled in the art will note that the cache-to-cache transfer prediction directory may be updated in a variety of ways.

As described above with reference to FIG. 9, when a valid copy of requested data is not returned in response to a "restricted" broadcast of requested data by a requesting processing node, a subsequent "unrestricted" broadcast of requested data is performed by the requesting processing node. In one or more embodiments of the present invention, the latency of the subsequent "unrestricted" broadcast may be reduced by buffering a copy of the requested data contained in the home memory in response to the "snoop" responses initiated by the prior "restricted" broadcast. In other words, because a processing node including the home memory of requested data may "see" the "snoop" responses from other processing nodes in response to a "restricted" broadcast, a copy of the requested data in the home memory may be accessed from, for example, DRAM, and held in a buffer for prompt return to the requesting processing node when the subsequent "unrestricted" broadcast is issued.

In one or more other embodiments of the present invention, if a processing node including the home memory of requested data "sees" that "snoop" responses from other processing nodes in response to a "restricted" broadcast do not return a valid copy of data requested by a requesting processing node, a copy of the requested data in the home memory may be returned to the requesting processing node without the need for a subsequent "unrestricted" broadcast.

Advantages of the present invention may include one or more of the following. In one or more embodiments of the present invention, a processing node in a snooping-based cache-coherent cluster of processing nodes maintains a cache-to-cache transfer prediction directory of addresses of data last transferred to the processing node by cache-to-cache transfers. In response to a local cache miss, the processing node may use the cache-to-cache transfer prediction directory to predict a cache-to-cache transfer and issue a restricted broadcast for requested data that allows only cache memories in the cluster to return copies of the requested data to the processing node. Accordingly, bandwidth that would otherwise be consumed by having a home memory return a copy of the requested data may be saved.

In one or more embodiments of the present invention, multiprocessing nodes may be easily connected together to desirably behave as a snooping-based cache-coherent SMP computer system.

In one or more embodiments of the present invention, because a network of connected servers uses a snooping-based cache-coherency technique to ensure cache-coherence among the servers, average latency, upon a local cache miss, may be reduced relative to the latency present with cable-connected servers having directory-based cache-coherence.

In one or more embodiments of the present invention, because a cache controller for each multiprocessing server in a network of multiprocessing servers has a relatively large cache memory, the frequency of network-wide data request broadcasts may be reduced.

In one or more embodiments of the present invention, because a SMP server may easily be removed or added from a network of point-to-point connected multiprocessing servers using snooping-based cache-coherence, the network of point-to-point connected multiprocessing servers may offer improved scalability and/or modularity.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
    a first processing node having a snooping-based cache-coherence controller, the first processing node further having a directory of addresses of data transferred by cache-to-cache transfers and prediction information associated with the addresses; and
    a second processing node operatively connected to the first processing node,
    wherein, in response to a cache miss for data requested by the first processing node, the snooping-based cache-coherence controller is arranged to, dependent on the directory, issue a restricted broadcast for the requested data to the second processing node.

2. The computer system of claim 1, wherein the restricted broadcast only allows a cache memory to return a copy of the requested data.

3. The computer system of claim 1, wherein, if the directory includes an address of the requested data, the snooping-based cache-coherence controller is arranged to issue the restricted broadcast if prediction information associated with the address is at a particular state.

4. The computer system of claim 3, wherein, in response to the restricted broadcast, if a valid copy of the requested data is not returned to the first processing node from a cache memory of the second processing node, the snooping-based cache-coherence controller is arranged to reset the prediction information.

5. The computer system of claim 3, wherein, in response to the restricted broadcast, if a valid copy of the requested data is not returned to the first processing node from a cache memory of the second processing node, the snooping-based cache-coherence controller is arranged to issue an unrestricted broadcast for the requested data to the second processing node.

6. The computer system of claim 1, wherein, if the directory includes an address of the requested data, the snooping-based cache-coherence controller is arranged to issue an unrestricted broadcast for the requested data to the second processing node if prediction information associated with the address is at a particular state.

7. The computer system of claim 6, wherein the unrestricted broadcast allows a home memory of the requested data to return a copy of the requested data.

8. The computer system of claim 6, wherein, in response to the unrestricted broadcast, if a valid copy of the requested data is returned to the first processing node from a cache memory of the second processing node, the snooping-based cache-coherence controller is arranged to update the prediction information.

9. The computer system of claim 6, wherein, in response to the unrestricted broadcast, if a valid copy of the requested data is not returned to the first processing node from a cache memory of the second processing node, the snooping-based cache-coherence controller is arranged to use a copy of the requested data returned by a home memory of the requested data.

10. The computer system of claim 1, wherein at least one of the first processing node and the second processing node is a SMP system.

11. The computer system of claim 1, wherein the first processing node and the second processing node are modular.

12. The computer system of claim 1, wherein the first processing node and the second processing node are point-to-point connected by interconnect having a bandwidth greater than that of 16-bit 1 GHz interconnect.

13. The computer system of claim 1, wherein the snooping-based cache-coherence controller of the first processing node comprises a cache memory arranged to selectively cache data requested by at least one integrated circuit in the first processing node.

14. The computer system of claim 13, wherein the cache memory is greater than 32 MB.

15. A method of performing operations in a network of point-to-point connected processing nodes, comprising:
    requesting data from a cache memory of a first processing node;
    if the requested data is not found in the cache memory, searching for an address of the requested data in a list of addresses of data transferred by cache-to-cache transfers in the network, wherein prediction information is associated with the addresses; and
    if an address of the requested data is found in the list and dependent on prediction information associated with the address, issuing a restricted broadcast for the requested data across the network of point-to-point connected processing nodes.

16. The method of claim 15, wherein the restricted broadcast allows only a cache memory in the network to return a copy of the requested data.

17. The method of claim 15, further comprising:
    if a valid copy of the requested data is not returned in response to the restricted broadcast, issuing an unrestricted broadcast for the requested data across the network of point-to-point connected processing nodes.

18. The method of claim 15, further comprising:
    if a copy of the requested data returned in response to the restricted broadcast is not valid, selectively resetting the prediction information.

19. The method of claim 15, further comprising:
    if a copy of the requested data returned in response to the restricted broadcast is valid, selectively updating the list.

20. The method of claim 15, further comprising:
if the address of the requested data is found in the list and dependent on prediction information associated with the address, issuing an unrestricted broadcast for the requested data across the network of point-to-point connected processing nodes.

21. The method of claim 20, wherein the unrestricted broadcast allows a home memory of the requested data to return a copy of the requested data.

22. The method of claim 15, further comprising:
if the address of the requested data is not found in the list, issuing an unrestricted broadcast for the requested data across the network of point-to-point connected processing nodes.

23. The method of claim 15, wherein at least one of the processing nodes is a SMP system.

24. A modular computer system, comprising:
a plurality of integrated circuits; and
a snooping-based cache-coherence controller operatively connected to the plurality of integrated circuits, the snooping-based cache-coherence controller having a cache memory and capable of maintaining a directory of addresses of data transferred by cache-to-cache transfers,
wherein the modular computer system is point-to-point connectable to other modular computer systems, and
wherein, if data requested by one of the plurality of integrated circuits is not found in the cache memory and an address of the requested data is found in the directory, the snooping-based cache-coherence controller is configured to issue a restricted broadcast for the requested data dependent on prediction information maintained in the directory for the address.

25. The modular computer system of claim 24, wherein the modular computer system is a SMP system.

26. The modular computer system of claim 24, wherein the restricted broadcast only allows a cache memory to return a copy of the requested data.

27. The modular computer system of claim 24, wherein, if a valid copy of the requested data is not returned in response to the restricted broadcast, the snooping-based cache-coherence controller is arranged to issue an unrestricted broadcast for the requested data.

28. The modular computer system of claim 27, wherein the unrestricted broadcast allows a home memory of the requested data to return a copy of the requested data.

29. A computer network, comprising:
a cluster of individual SMP computer systems that are connected using point-to-point interconnect, at least one of the individual SMP computer systems having a snooping-based cache-coherence controller and a directory of addresses of data transferred by cache-to-cache transfers in the network,
wherein, in response to a cache miss for requested data in the cache memory of the at least one of the individual SMP computers and dependent on the directory, the snooping-based cache-coherence controller is arranged to issue a restricted broadcast for the requested data across the cluster.

30. The computer network of claim 29, wherein the restricted broadcast only allows a cache memory in the cluster to return a copy of the requested data.

31. The computer network of claim 29, wherein, if a valid copy of the requested data is not returned in response to the restricted broadcast, the snooping-based cache-coherence controller is arranged to issue an unrestricted broadcast for the requested data across the cluster.

32. The computer network of claim 31, wherein the unrestricted broadcast allows a home memory of the requested data to return a copy of the requested data.

33. The computer network of claim 29, wherein a copy of the requested data in a home memory of the requested data is buffered in response to the restricted broadcast.

34. A computer system, comprising:
a plurality of integrated circuits;
a snooping-based cache-coherence controller connected to the plurality of integrated circuits and having a cache memory and a list of addresses of data transferred by cache-to-cache transfers; and
memory comprising instructions to:
selectively request data from the cache memory,
if the requested data is not found in the cache memory, search the list for an address of the requested data, and
if the address of the requested data is found in the list, issue a restricted broadcast for the requested data dependent on prediction information associated with the address.

35. The computer system of claim 34, wherein the restricted broadcast only allows a cache memory to return a copy of the requested data.

36. The computer system of claim 34, the memory further comprising instructions to:
if the address of the requested data is not found in the list, issue an unrestricted broadcast for the requested data.

37. The computer system of claim 34, the memory further comprising instructions to:
if a valid copy of the requested data is not returned in response to the restricted broadcast, issue an unrestricted broadcast for the requested data.

38. The computer system of claim 37, the memory further comprising instructions to:
if a valid copy of the requested data is not returned in response to the restricted broadcast, reset the prediction information.

39. The computer system of claim 34, the memory further comprising instructions to:
if a valid copy of the requested data is returned in response to the restricted broadcast, update the directory.

* * * * *